United States Patent
Hwang et al.

(10) Patent No.: US 7,633,900 B2
(45) Date of Patent: Dec. 15, 2009

(54) APPARATUS AND METHOD FOR ASSIGNING SUBCHANNELS IN AN OFDMA COMMUNICATION SYSTEM

(75) Inventors: In-Seok Hwang, Seoul (KR); Soon-Young Yoon, Seongnam-si (KR); Sang-Hoon Sung, Suwon-si (KR); Jae-Hee Cho, Seoul (KR); Hoon Huh, Seongnam-si (KR); Kwan-Hee Roh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 880 days.

(21) Appl. No.: 10/894,220

(22) Filed: Jul. 19, 2004

(65) Prior Publication Data

US 2005/0013279 A1 Jan. 20, 2005

(30) Foreign Application Priority Data

Jul. 18, 2003 (KR) .................. 10-2003-0049341

(51) Int. Cl.
*H04Q 7/00* (2006.01)
(52) U.S. Cl. .................. 370/329; 370/341; 370/348
(58) Field of Classification Search ................ 455/447; 370/260, 330, 329, 465, 232, 341, 348
See application file for complete search history.

(56) References Cited

U.S. PATENT DOCUMENTS

| | | | | |
|---|---|---|---|---|
| 6,377,636 | B1* | 4/2002 | Paulraj et al. | 375/346 |
| 7,072,315 | B1* | 7/2006 | Liu et al. | 370/329 |
| 7,224,741 | B1* | 5/2007 | Hadad | 375/260 |
| 2001/0055320 | A1* | 12/2001 | Pierzga et al. | 370/480 |
| 2002/0147017 | A1* | 10/2002 | Li et al. | 455/447 |
| 2003/0021245 | A1* | 1/2003 | Haumonte et al. | 370/330 |
| 2004/0136393 | A1* | 7/2004 | Riveiro Insua et al. | 370/432 |
| 2004/0190640 | A1* | 9/2004 | Dubuc et al. | 375/260 |
| 2005/0094597 | A1* | 5/2005 | Hwang et al. | 370/329 |
| 2006/0146867 | A1* | 7/2006 | Lee et al. | 370/465 |

* cited by examiner

*Primary Examiner*—Ajit Patel
*Assistant Examiner*—Khai M Nguyen
(74) *Attorney, Agent, or Firm*—The Farrell Law Firm, LLP

(57) ABSTRACT

A wireless communication system that divides an entire frequency band into a plurality of subcarrier bands and includes a plurality of subchannels, each of which is a set of a predetermined number of subcarrier bands. As many subcarrier groups as the number of the base stations are generated by classifying the subcarrier bands in a predetermined period. For a particular base station, corresponding subcarrier bands are detected from each of the groups according to a predetermined sequence. The subcarrier bands detected from each of the groups are assigned as a subchannel for the particular base station.

31 Claims, 4 Drawing Sheets

APPARATUS AND METHOD FOR ASSIGNING SUBCHANNELS IN AN OFDMA COMMUNICATION SYSTEM

PRIORITY

This application claims priority under 35 U.S.C. § 119 to an application entitled "Apparatus and Method for Assigning Subchannel in an OFDMA Communication system" filed in the Korean Intellectual Property Office on Jul. 18, 2003 and assigned Serial No. 2003-49341, the contents of which are incorporated herein by reference.

BACKGROUND OF THE INVENTION

1. Field of the Invention

The present invention relates generally to a communication system supporting an Orthogonal Frequency Division Multiple Access (OFDMA) scheme (hereinafter referred to as an "OFDMA communication system"), and in particular, to an apparatus and method for adaptively assigning subchannels.

2. Description of the Related Art

In the late 1990's, South Korea partially deployed a third generation (3G) mobile communication system supporting IMT-2000 (International Mobile Telecommunication-2000), intending to advance wireless multimedia service, worldwide roaming, and high-speed data service. The 3G mobile communication system was developed specifically to transmit data at a higher rate along with the rapid increase of serviced data amount.

The 3G mobile communication system is currently evolving into a fourth generation (4G) mobile communication system. The 4G mobile communication system is being standardized for the purpose of efficient interworking and integrated service between a wired communication network and a wireless communication network, beyond a simple wireless communication service, which the previous-generation mobile communication systems provided. Accordingly, technology for transmitting a large volume of data at a same level available in the wired communication network must be developed for the new wireless communication network.

In this context, many studies are being conducted on using an Orthogonal Frequency Division Multiplexing (OFDM) scheme as a scheme for high-speed data transmission over wired/wireless channels in the 4G mobile communication system. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal subcarriers (or subcarrier channels) before being transmitted.

The first MCM systems appeared in the late 1950's for military high frequency (HF) radio communication, and the OFDM scheme for overlapping orthogonal subcarriers was initially developed in the 1970's. In view of orthogonal modulation between multiple carriers, the OFDM scheme has limitations in actual implementation. In 1971, Weinstein, et al. proposed that OFDM modulation/demodulation can be efficiently performed using Discrete Fourier Transform (DFT), which was a driving force behind the development of the OFDM scheme. Also, the introduction of a guard interval and a cyclic prefix as the guard interval further mitigates adverse effects of multipath propagation and delay spread on systems. As a result, the OFDM scheme has been widely used for digital data communication technologies such as digital audio broadcasting (DAB), digital TV broadcasting, wireless local area network (WLAN), and wireless asynchronous transfer mode (WATM).

Although hardware complexity was an obstacle to widespread implementation of the OFDM scheme, recent advances in digital signal processing technology including fast Fourier transform (FFT) and inverse fast Fourier transform (IFFT) enable the OFDM scheme to be implemented. The OFDM scheme, similar to an existing Frequency Division Multiplexing (FDM) scheme, boasts of optimum transmission efficiency in high-speed data transmission because it transmits data on subcarriers, while maintaining orthogonality among them. The optimum transmission efficiency is further attributed to good frequency use efficiency and robustness against multipath fading in the OFDM scheme. More specifically, overlapping frequency spectrums lead to efficient frequency use and robustness against frequency selective fading and multipath fading. The OFDM scheme reduces effects of intersystem interference (ISI) by use of guard intervals and enables design of a simple equalizer hardware structure. Furthermore, because the OFDM scheme is robust against impulse noise, it is increasingly popular in communication systems.

The OFDMA scheme is a Multiple Access scheme based on the OFDM scheme. In the OFDMA scheme, subcarriers in one OFDM symbol are distributed to a plurality of users, or subscriber stations. A communication system using the OFDMA scheme includes an IEEE 802.16a communication system and an IEEE 802.16e communication system. The IEEE 802.16a communication system is a fixed-Broadband Wireless Access (BWA) communication system using the OFDMA scheme. The IEEE 802.16e communication system is a system that considers the mobility of subscriber stations in the IEEE 802.16a communication system. Currently, the IEEE 802.16a communication system and the IEEE 802.16e communication system both use 2048-point IFFT and 1702 subcarriers. The IEEE 802.16a communication system and the IEEE 802.16e communication system use 166 subcarriers among the 1702 subcarriers as pilot subcarriers, and use 1536 subcarriers, not including the 166 subcarriers, as data subcarriers.

The 1536 data subcarriers are divided into 32 subchannels, each having 48 data subcarriers. The subchannels are assigned to a plurality of users according to system conditions. The term "subchannel" refers to a channel comprised of a plurality of subcarriers. Herein, each subchannel is comprised of 48 subcarriers. The OFDMA communication system distributes all subcarriers, particularly, data subcarriers used therein over the entire frequency band, thereby acquiring frequency diversity gain.

The IEEE 802.16a communication system and the IEEE 802.16e communication system divide a broadband of, for example, 10 [MHz] into subchannels only in a frequency domain. As indicated above, the IEEE 802.16a communication system and the IEEE 802.16e communication system use 2048-point IFFT and thus use 1702 subcarriers per OFDM symbol. Therefore, when subchannels are assigned using Reed Solomon (RS) sequences, which secures an excellent inter-subchannel collision characteristic in a multi-cell environment, it is possible to identify about 40 cells (e.g., 41*40=1640).

However, in order to facilitate network design along with the development of communication systems, it is necessary to increase the number of identifiable cells up to 100. The OFDMA scheme has limitations in generating subchannels only in a frequency domain in terms of the number of identifiable cells. Further, a Flash-OFDM scheme using a narrowband of 1.25 [MHz] uses 128-point IFFT, and defines 112 hopping sequences that hop different subcarriers for one period comprised of 113 OFDM symbols, as a basic resource assignment unit. A communication system supporting the Flash-OFDM scheme (hereinafter referred to as a "Flash-OFDM communication system") defines different hopping frequencies for 113 cells in designing networks, thereby making it possible to identify 113 different cells. However, the Flash-OFDM scheme, being a narrowband-only scheme, cannot contribute to the required capacity increase.

SUMMARY OF THE INVENTION

It is, therefore, an object of the present invention to provide a subcarrier assignment apparatus and method in an OFDMA communication system.

It is another object of the present invention to provide a time-frequency 2-dimensional subcarrier assignment apparatus and method in an OFDMA communication system.

It is further another object of the present invention to provide a subcarrier assignment apparatus and method for identifying base stations in an OFDMA communication system.

It is yet another object of the present invention to provide a subcarrier assignment apparatus and method for minimizing collisions between subchannels used in neighbor base stations in an OFDMA communication system.

In accordance with one aspect of the present invention, there is provided an apparatus for assigning subchannels to each of a plurality of base stations included in a wireless communication system that divides an entire frequency band into a plurality of subcarrier bands and includes a plurality of subchannels, each of which is a set of a predetermined number of subcarrier bands. The apparatus includes a subchannel assigner that generates as many subcarrier groups as the number of the base stations by classifying the subcarrier bands in a predetermined period, detects, for a particular base station, corresponding subcarrier bands from each of the groups according to a predetermined sequence, and assigns the detected subcarrier bands as a subchannel for the particular base station; and a transmitter that, if there is data to transmit, transmits the data over the subchannel assigned by the subchannel assigner.

In accordance with another aspect of the present invention, there is provided an apparatus for assigning subchannels to each of a plurality of base stations includes in a wireless communication system that divides an entire frequency band into a plurality of subcarrier bands and includes a plurality of subchannels, each of which is a set of a predetermined number of subcarrier bands. The apparatus includes a subchannel assigner for generating as many subcarrier groups as the number of the base stations by classifying the subcarrier bands in each of a predetermined number of symbol periods, detecting, for a first base station, corresponding subcarrier bands from each of the groups according to a first sequence representing indexes of subcarriers assigned as a first subchannel and assigning the detected subcarrier bands as a first subchannel for the first base station, and detecting, for a second base station, corresponding subcarrier bands from each of the groups according to a second sequence obtained by permuting the first sequence a predetermined number of times and assigning the detected subcarrier bands as a first subchannel for the second base station; and a transmitter for transmitting data over the subchannels assigned by the subchannel assigner, if there is data to transmit.

In accordance with yet another aspect of the present invention, there is provided a method for assigning subchannels to each of a plurality of base stations included in a wireless communication system that divides an entire frequency band into a plurality of subcarrier bands and includes a plurality of subchannels, each of which is a set of a predetermined number of subcarrier bands. The method includes generating as many subcarrier groups as the number of the base stations by classifying the subcarrier bands in a predetermined period; detecting, for a particular base station, corresponding subcarrier bands from each of the groups according to a predetermined sequence; and assigning the subcarrier bands detected from each of the groups as a subchannel for the particular base station.

In accordance with further another aspect of the present invention, there is provided a method for assigning subchannels to each of a plurality of base stations included in a wireless communication system that divides an entire frequency band into a plurality of subcarrier bands and includes a plurality of subchannels, each of which is a set of a predetermined number of subcarrier bands. The method includes generating as many subcarrier groups as the number of the base stations by classifying the subcarrier bands in each of a predetermined number of symbol periods; detecting, for a first base station, corresponding subcarrier bands from each of the groups according to a first sequence representing indexes of subcarriers assigned as a first subchannel; assigning the subcarrier bands detected from each of the groups according to the first sequence as a first subchannel for the first base station; detecting, for a second base station, corresponding subcarrier bands from each of the groups according to a second sequence obtained by permuting the first sequence a predetermined number of times; and assigning the subcarrier bands detected from each of the groups according to the second sequence as a first subchannel for the second base station.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention assigns subchannels in a time-frequency 2-dimensional domain in a communication system using an Orthogonal Frequency Division Multiple Access (OFDMA) scheme (hereinafter referred to as an "OFDMA communication system"). Accordingly, the present invention increases the number of identifiable cells, or base stations, in the OFDMA communication system, and minimizes collision between subchannels used in neighbor base stations. Each base station can manage one cell or a plurality of cells. However, for ease of description, it will be assumed herein that each base station manages only one cell.

Figure 1:
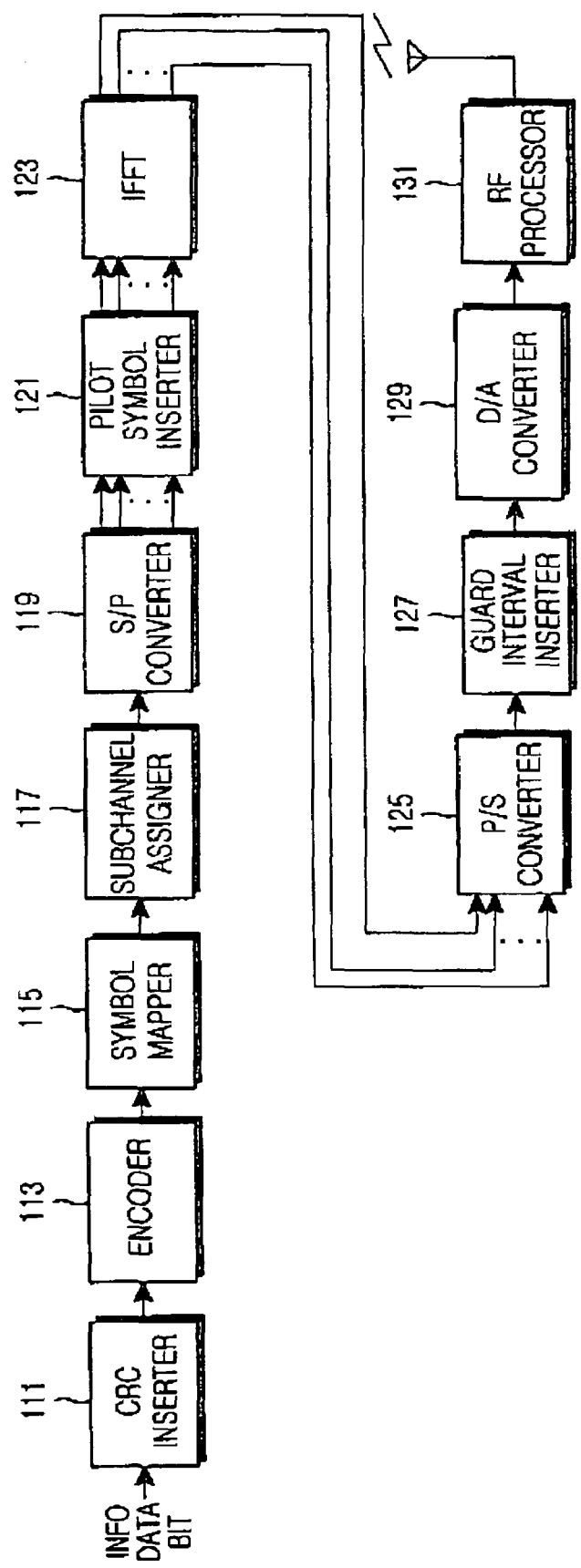
FIG. 1 illustrates a block diagram illustrating a transmitter in an OFDMA communication system according to an embodiment of the present invention.

FIG. 1 shows a block diagram illustrating a transmitter in an OFDMA communication system according to an embodiment of the present invention. Referring to FIG. 1, a transmitter of the OFDMA communication system includes a cyclic redundancy check (CRC) inserter 111, an encoder 113, a symbol mapper 115, a subchannel assigner 117, a serial-to-parallel (S/P) converter 119, a pilot symbol inserter 121, an inverse fast Fourier transform (IFFT) block 123, a parallel-to-serial (P/S) converter 125, a guard interval inserter 127, a digital-to-analog (D/A) converter 129, a radio frequency (RF) processor 131. When there are user data bits and control data bits to transmit, the user data bits and the control data bits are input to the CRC inserter 111. Herein, the user data bits and the control data bits will be referred to as "information data bits." the CRC inserter 111 inserts CRC bits in the information data bits, and outputs CRC-inserted information data bits to the encoder 113. The encoder 113 encodes the signal output from the CRC inserter 111 using a predetermined coding technique, and outputs the encoded signal to the symbol mapper 115. Preferably, turbo coding or convolutional coding is used as the coding technique.

The symbol mapper 115 modulates the coded bits output from the encoder 113 into modulation symbols using a predetermined modulation technique, and outputs the modulation symbols to the subchannel assigner 117. Preferably, quadrature phase shift keying (QPSK) or 16-ary quadrature amplitude modulation (16 QAM) is used as the modulation technique. The subchannel assigner 117 assigns subchannels by receiving the modulation symbols output from the symbol mapper 115, and outputs the subchannel-assigned modulation symbols to the to the serial-to-parallel converter 119. An operation of assigning subchannels in the subchannel assigner 117 is performed in a subchannel assignment method proposed by the present invention, which will be described in more detail herein below.

The serial-to-parallel converter 119 parallel-converts the subchannel-assigned serial modulation symbols output from the subchannel assigner 117, and outputs the parallel-converted modulation symbols to the pilot symbol inserter 121. The pilot symbol inserter 121 inserts pilot symbols into the parallel-converted modulation symbols output from the serial-to-parallel converter 119, and outputs the pilot-inserted modulation symbols to the IFFT block 123.

The IFFT block 123 performs N-point IFFT on the pilot-inserted modulation symbols output from the pilot symbol inserter 121, and outputs the IFFT-processed modulation symbols to the parallel-to-serial converter 125. The parallel-to-serial converter 125 serial-converts the IFFT-processed parallel modulation symbols, and outputs the serial-converted modulation symbols to the guard interval inserter 127. The guard interval inserter 127 inserts a guard interval signal into the serial-converted modulation symbols, and outputs the guard interval-inserted modulation symbols to the digital-to-analog converter 129. The guard interval is inserted to remove interference between a previous OFDM symbol transmitted at a previous OFDM symbol time and a current OFDM symbol to be transmitted at a current OFDM symbol time in an OFDM communication system. Generally, null data is inserted into the guard interval. In this case, however, when a receiver incorrectly estimates a start point of an OFDM symbol, interference occurs between subcarriers, causing an increase in an incorrect estimation rate for the received OFDM symbol. Therefore, a cyclic prefix method or a cyclic postfix method is used. In the cyclic prefix method, a predetermined number of last samples of an OFDM symbol in a time domain are copied and inserted into a valid OFDM symbol, and in the cyclic postfix method, a predetermined number of first samples of an OFDM symbol in a time domain are copied and inserted into a valid OFDM symbol.

The digital-to-analog converter 129 analog-converts the signal output from the guard interval inserter 127, and outputs the analog-converted signal to the RF processor 131. The RF processor 131, including a filter and a front-end unit, RF-processes the signal output from the digital-to-analog converter 129 such that the signal, and transmits the RF-processed signal over the air via a transmission antenna.

(1) Subchannel Assignment in a Time-Frequency 2-Dimensional Domain

Indexes of subcarriers included in a subchannel are assigned using a Reed Solomon (RS) sequence, and the subchannel is generated using subcarriers corresponding to the assigned subcarrier indexes. All subcarriers included in the OFDMA communication system are divided into (Q−1) groups, and each of the (Q−1) groups has Q consecutive subcarriers.

The Reed Solomon sequence is defined in a Galois Field. A Galois Field (Q) comprises Q elements of $\{0, 1, 2, \ldots, Q-1\}$. Here, Q denotes a size of Galois Field, and when the Q is a prime number, an addition operation and a multiplication operation in Galois Field (Q) are defined as shown below in Equation (1).

$$a+b=(a+b) \bmod Q, \text{ for } a, b \in 0, 1, 2, \ldots, Q-1$$

$$a*b=(a*b) \bmod Q, \text{ for } a, b \in 0, 1, 2, \ldots, Q-1 \qquad (1)$$

A sequence S defined in the Galois Field (Q) is a subchannel sequence, assigned to each of the (Q−1) groups, indicating positions of subcarriers included in a subchannel. Indexes of the subcarriers included in a subchannel are expressed in Equation (2).

$$\text{Subcarrier\_index}(i) = Q*i + S(i) \qquad (2)$$

In Equation (2), 'i' denotes a group index indicating a particular group among all of the (Q−1) groups of the OFDMA communication system. The group index 'i' has any one of the values $0, 1, \ldots, Q-2$. Further, S(i) denotes an $(i+1)^{th}$ element in a sequence S, and represents positions of subcarriers in the corresponding group.

If the sequence of Equation (2), i.e., the sequence representing indexes of subcarriers included in a subchannel, is defined, a subchannel corresponding to the sequence can be defined. For example, if it is assumed that the number of all subcarriers of the OFDMA communication system is 42 of $\{0, 1, 2, \ldots, 41\}$, the 42 subcarriers can be divided into 6 groups. In addition, 6 subcarriers included in a particular subchannel can be assigned using a length-6 sequence. That is, if indexes of $\{3, 2, 6, 4, 5, 1\}$ are given for a subchannel sequence S, a corresponding subchannel is generated using sequences having indexes $\{3, 9, 20, 25, 33, 36\}$ of subcarriers.

In addition, permutation and offset for a basic sequence are used for identifying a particular base station and subchannels in the base station. Herein, the basic sequence is defined as $S_0$, and the basic sequence $S_0$ is expressed as shown in Equation (3).

$$S_0 = \alpha, \alpha^2, \alpha^3, \ldots, \alpha^{Q-2}, \alpha^{Q-1} \qquad (3)$$

In Equation (3), $\alpha$ denotes a primitive element of Galois Field (Q) ($\alpha^m \ne 1$ for $m < Q-1, \alpha^{Q-1}=1$). If a size Q of the Galois Field is 7 (Q=7), the primitive element $\alpha$ becomes 3 and $S_0=\{3, 3^2, 3^3, \ldots, 3^5, 3^6\}$ mod $7=\{3, 2, 6, \underline{4}, \underline{5}, 1\}$. Here, the basic sequence $S_0$ represents a sequence assigned to a subchannel #0 for a reference base station among a plurality of base stations included in the OFDMA communication system. It is assumed herein that the reference base station is a base station #0 and the base station #0 becomes a first base station among the base stations constituting the OFDMA communication system. Also, the subchannel #0 becomes a first subchannel among Q subchannels.

A sequence $S_m$ assigned to a cell #m is a sequence determined by permuting the basic sequence $S_0$ m times. The sequence $S_m$ is expressed as shown in Equation (4).

$$S_m = \alpha^m S_0 = \alpha^{Q-m}, \alpha^{Q-m+1}, \ldots, \alpha^{Q-2}, \alpha^{Q-1}, \alpha, \alpha^2, \ldots, \alpha^{Q-m-1} \quad (4)$$

In Equation (4), $S_m$ denotes a sequence assigned to a subchannel #0 of a base station #m.

In addition, a sequence $S_{m,\beta}$ for defining subchannels in the base station #m because a sequence determined by adding an offset $\beta$ to a sequence $S_m$ assigned to a subchannel #0 of the cell #m. The sequence $S_{m,\beta}$ for defining subchannels in the base station #m is expressed in Equation (5) below.

$$S_{m,\beta} = S_m + \beta, \beta, \beta, \ldots, \beta, \beta; \beta \in GF(Q) \quad (5)$$

In Equation (5), GF(Q) denotes Galois Field(Q).

Accordingly, it is possible to assign subchannels to all of the (Q−1) base stations of the OFDMA communication system. Therefore, it is possible to obtain Q subchannel sequences for each of the (Q−1) base stations. The obtained subchannel sequences are advantageous in that a maximum of only one subchannel may possibly collide between neighbor base stations, thereby preventing deterioration in system performance due to subchannel collision.

Referring to Table 1 and Table 2, a description will now be made of base station sequences for a subchannel #0 and sequences for designating subchannels in a base station #0, when a size Q of Galois Field is 7 (Galois Field (Q)=7), α=3, and basic sequence $S_0=\{3, 2, 6, 4, 5, 1\}$.

TABLE 1

| $S_0$ | 3 | 2 | 6 | 4 | 5 | 1 |
|---|---|---|---|---|---|---|
| $S_1$ | 1 | 3 | 2 | 6 | 4 | 5 |
| $S_2$ | 5 | 1 | 3 | 2 | 6 | 4 |
| $S_3$ | 4 | 5 | 1 | 3 | 2 | 6 |
| $S_4$ | 6 | 4 | 5 | 1 | 3 | 2 |
| $S_5$ | 2 | 6 | 4 | 5 | 1 | 3 |

TABLE 2

| $S_{0,0}$ | 3 | 2 | 6 | 4 | 5 | 1 |
|---|---|---|---|---|---|---|
| $S_{0,1}$ | 4 | 3 | 0 | 5 | 6 | 2 |
| $S_{0,2}$ | 5 | 4 | 1 | 6 | 0 | 3 |
| $S_{0,3}$ | 6 | 5 | 2 | 0 | 1 | 4 |
| $S_{0,4}$ | 0 | 6 | 3 | 1 | 2 | 5 |
| $S_{0,5}$ | 1 | 0 | 4 | 2 | 3 | 6 |
| $S_{0,6}$ | 2 | 1 | 5 | 3 | 4 | 0 |

Table 1 illustrates sequences for assigning a subchannel #0 of different cells using permutation, and Table 2 illustrates sequences for assigning subchannels in a base station #0 by adding an offset to indexes of subchannels in a base station. As illustrated in Table 1, a maximum of only one subchannel may possibly collide, thereby preventing a reduction in system performance due to subchannel collision. However, unlike this, it is possible to identify subchannels in a base station by permuting a basic sequence as illustrated in Table 1, and it is also possible to generate different sequences for identifying base stations by adding an offset to the basic sequence as illustrated in Table 2.

In a cellular communication system in which a frequency reuse rate is 1, it is necessary to increase the total number of identifiable base stations in the system to facilitate installation of base stations in designing networks. In order to increase the number of identifiable base stations, it is necessary to increase a value Q of the Galois Field (Q). In order to increase the number of identifiable base stations, the present invention proposes a 2-dimensional subchannel assignment method considering not only a frequency domain but also a time domain. For example, assuming that 97*16=1552 subcarriers are transmitted per OFDM symbol, if six OFDM symbols are used as one subcarrier assignment unit, it can be regarded that 97*16*6=97*96 data subcarriers are used. In this case, if the subchannel sequence is defined on Galois Field (97), 97 subchannels can be assigned in each of 96 cells. A basic sequence $S_0$ using a primitive element of 5 on Galois Field (97) can be calculated by substituting Q=97 and α=5 in Equation (3), and the basic sequence $S_0$ is expressed as shown below in Equation (6).

$$S_0=\{5, 25, 28, 43, 21, 8, 40, 6, 30, 53, 71, 64, 29, 48,$$
$$46, 36, 83, 27, 38, 93, 77, 94, 82, 22, 13, 65, 34,$$
$$73, 74, 79, 7, 35, 78, 2, 10, 50, 56, 86, 42, 16, 80,$$
$$12, 60, 9, 45, 31, 58, 96, 92, 72, 69, 54, 76, 89,$$
$$57, 91, 67, 44, 26, 33, 68, 49, 51, 61, 14, 70, 59,$$
$$4, 20, 3, 15, 75, 84, 32, 63, 24, 23, 18, 90, 62, 19,$$
$$95, 87, 47, 41, 11, 55, 81, 17, 85, 37, 88, 52, 66,$$
$$39, 1\} \quad (6)$$

Figure 2:
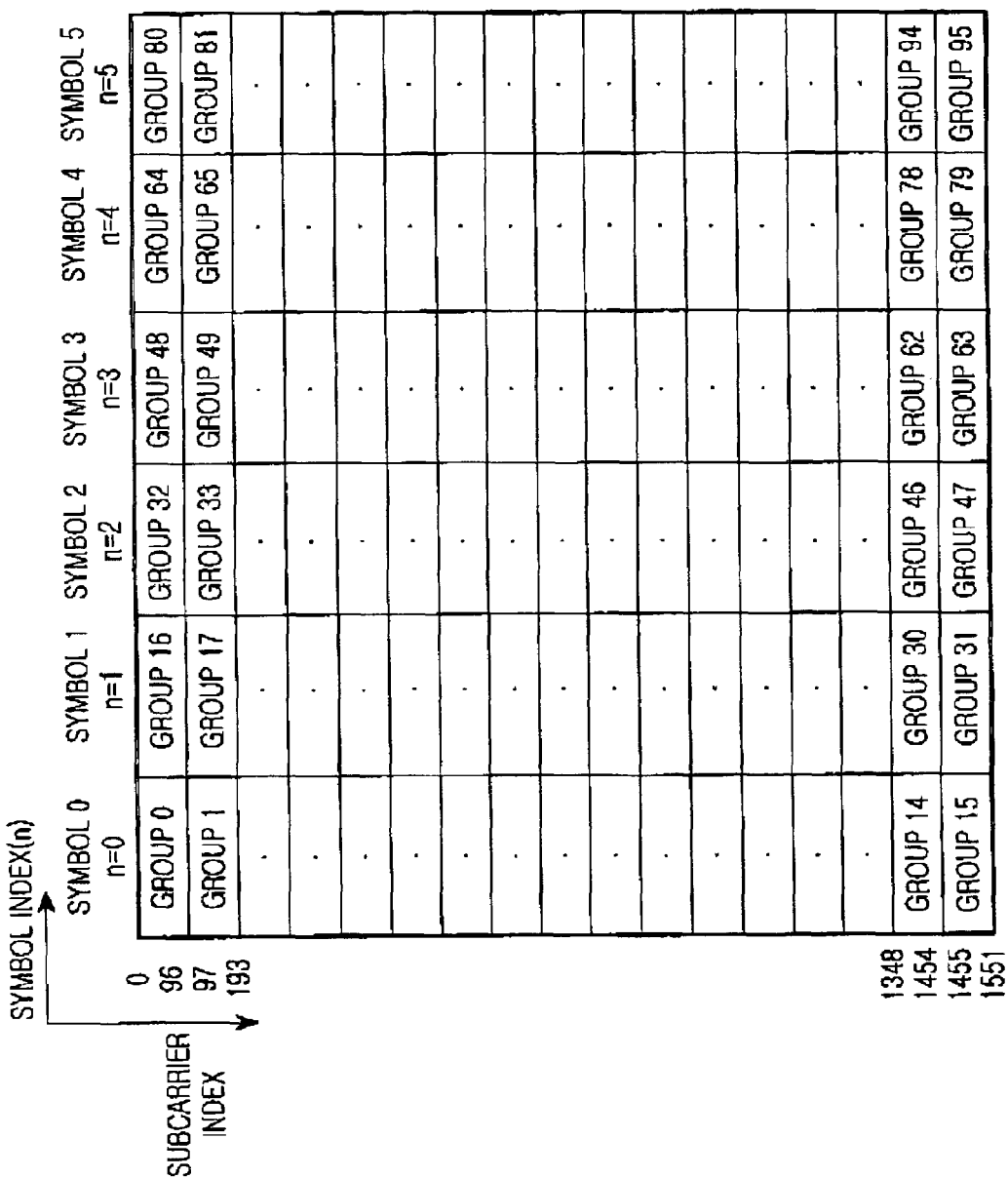
FIG. 2 illustrates a process of assigning subchannels in a time-frequency 2-dimensional domain according to an embodiment of the present invention.

FIG. 2 shows a diagram schematically illustrating a process of assigning subchannels in a time-frequency 2-dimensional domain according to an embodiment of the present invention. However, before a description of FIG. 2 is given, it will be assumed that 96 base stations can be identified in an OFDMA communication system and subcarriers are assigned such that 97 subchannels can be identified for each of the 96 base stations. That is, as illustrated in FIG. 2, 97*96 subcarriers are divided into 96 groups for 6 OFDM symbol periods in a time-frequency domain, and 97 consecutive subcarriers are arranged in each of the 96 groups. In FIG. 2, "subcarrier index" denotes indexes of subcarriers, and "symbol index" denotes indexes of OFDM symbols in a time domain.

In FIG. 2, because a size Q of the Galois Field is 97 (Q=97), a sequence ($\{S_{m,\beta}\}$, for $0 \leq m \leq 95$ and $0 \leq \beta \leq 96$) for defining subchannels in a base station #m can be generated using Equations (4) and (5) and the basic sequence $S_0$ of Equation (6). Because the sequence ($\{S_{m,\beta}\}$, for $0 \leq m \leq 95$ and $0 \leq \beta \leq 96$) for defining subchannels in a base station #m is generated, 97 subchannels can be assigned to each of 96 base stations.

In the OFDMA communication system, if Q(Q−1) subcarriers in multiple OFDM symbol period are used, N groups are generated using Q*N subcarriers in on OFDM symbol, and if (Q−1)/N OFDM symbols are used, indexes of subcarriers constituting each of the subchannels are expressed as shown in Equation (7)

$$\text{Subcarrier\_index}(n;i) = Q^*(i - N^*\lfloor i/N \rfloor) + S_{m,\beta}(i); n = \lfloor i/N \rfloor \quad (7)$$

In Equation (7), $\lfloor x \rfloor$ represents a maximum integer, which is smaller than or equal to a value 'x'. In FIG. 2, because Q=97 and N=16, the group index 'i' has any one of the values of 0 to Q−2, i.e., 0 to 95, and the symbol index 'n' has any one of the values of 0 to 5. For example, subcarrier indexes for a subchannel #0 of a base station #0 are Symbol 0: 5, 122, 222, 334, 409, 493, 622, 685, 806, 926, 1041, 1131, 1193, 1309, 1404, 1491

Symbol 1: 83, 124, 232, 384, 465, 579, 664, 701, 789, 938, 1004, 1140, 1238, 1340, 1365, 1490

Symbol 2: 78, 99, 204, 341, 444, 571, 624, 695, 856, 885, 1030, 1076, 1209, 1292, 1416, 1551

Symbol 3: 92, 169, 263, 345, 464, 574, 639, 770, 843, 917, 996, 1100, 1232, 1310, 1409, 1516

Symbol 4: 14, 167, 253, 295, 408, 488, 597, 754, 860, 905, 1033, 1091, 1187, 1279, 1448, 1517

Symbol 5: 19, 192, 281, 338, 429, 496, 637, 760, 793, 958, 1007, 1155, 1216, 1327, 1397, 1456

If subcarriers are assigned in this manner, collision may possibly occur in a maximum of only one subchannel among subchannels belonging to different cells as described above, and the collision rate is much lower than that in the existing communication systems. For example, the IEEE 802.16a communication system can assign 32 subchannels for each cell, and subchannels from different cells suffer collision in 0 to 5 subcarrier positions. When subcarriers are assigned as described in the present invention, the number of collisions between subcarriers constituting subchannels is reduced to 0 or 1.

For example, when the Reed Solomon sequence is used, because each subchannel has (Q—1) subcarriers and the number of collisions of subcarriers constituting subchannels for different cells is a maximum of 1, a ratio of collided subcarriers becomes a maximum of $1/(Q-1)$ and this value is reduced as the value Q increases. Therefore, the time-frequency 2-dimensional subcarrier assignment scheme proposed in the present invention can advantageously increase the number of identifiable cells and minimize a ratio of collided subcarriers.

(2) Subchannel Assignment for Data Transmission

A transmitter, or a base station, of the OFDMA communication system transmits data by assigning a part of one subchannel or at least one subchannel according to a decoding delay time and the amount of transmission data. For example, for the data transmission, a total of Q data assignment units can be generated by inserting transmission data on a subchannel basis. Here, the "data assignment unit" refers to a resource assignment unit using the same channel coding scheme and modulation scheme. It will be assumed that ½ turbo coding is used as the channel coding scheme and QPSK is used as the modulation scheme.

Generally, a coding gain increases as a length of a codeword becomes longer. For example, if a size of information bits included in the codeword becomes larger than 1000 bits, performance saturation occurs. Therefore, when 96 subcarriers are used per subchannel and QPSK and ½ channel coding are used as a modulation scheme and a coding scheme, channel coding should be performed on about every 10 subchannels in order to maximize a coding gain.

Figure 3:
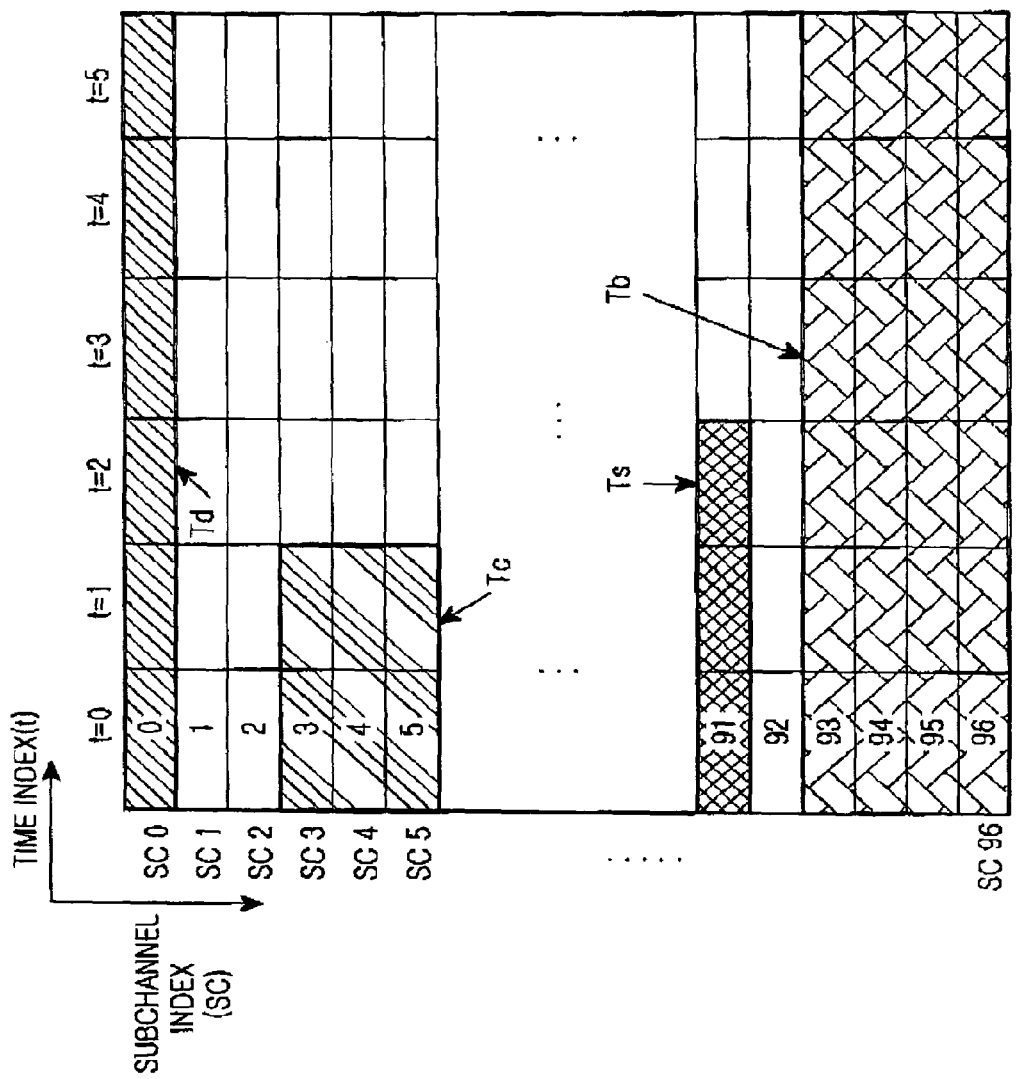
FIG. 3 illustrates a process of assigning subchannels for data transmission according to an embodiment of the present invention.

FIG. 3 shows a diagram illustrating a process of assigning subchannels for data transmission according to an embodiment of the present invention. However, before a description of FIG. 3 is given, as indicated above, it will also be assumed herein that 96 base stations can be identified in an OFDMA communication system and subcarriers are assigned such that 97 subchannels can be identified for each of the 96 base stations. FIG. 3 illustrates an example where subchannels are properly assigned according to their objects when the number of identifiable subchannels in one cell is 97, i.e., Q=97.

Referring to FIG. 3, a unit rectangle is comprised of 16 subcarriers, and the unit rectangles are grouped for a 6-OFDM symbol period in a time axis, thereby generating one subchannel, which is represented by Td. Here, a unit rectangle representing 16 subcarriers, which are partial subcarriers included in the subchannel, will be referred to as a "subchannel unit." One subchannel includes 6 subchannel units.

When there is a large amount of transmission data, two or more subchannels can be grouped to transmit the data. Subchannels used for the data transmission are represented by Tb. That is, 4 subchannels of a subchannel 93 (SC 93) to a subchannel 96 (SC 96) are used to transmit the data. Here, the maximum number of collisions between subcarriers included in the subchannel unit is identical to the number of subchannel indexes used in a frequency domain. For the subchannel represented by Td and the partial subchannel (3 subchannel units) represented by Ts, the number of subcarrier collisions between neighbor cells is a maximum of 1, and for the subchannel units of different subchannels represented by Tc and the subchannels represented by Tb, the maximum number of collisions can become a maximum of 3 or 4.

A description will now be made herein below of a relationship between the maximum number of collisions for each subchannel and a decoding delay. The subchannels represented by Td and the subchannel units of different subchannels represented by Tc use the same area, i.e., the same number of subcarriers, and for the subchannels represented by Td, a maximum of one collision with subchannels Td of neighbor cells occurs and a decoding delay becomes 6 OFDM symbols. For the subchannel units of different subchannels represented by Tc, a maximum of three collisions with subchannel units of different subchannels Tc of neighbor cells occurs and a decoding delay becomes 2 OFDM symbols.

More specifically, in a 2-dimensional domain of a subchannel index SC and a time index t, a trade-off relation exists between the maximum number of collisions for subcarriers constituting the subchannel unit and a decoding delay. When data is transmitted for a time period shorter than a 6-OFDM symbol period, a coding rate must be increased. When subchannel units of different subchannels represented by Tc, i.e., a subchannel #3, a subchannel #4, and a subchannel #5, are used for 2 OFDM symbols, and a subchannel unit represented by Ts, i.e., a subchannel #91, is used for 3 OFDM symbols, it is effective to transmit data, which is relatively short in length and needs a short decoding delay. For example, the data that is relatively short in length and needs a short decoding delay includes paging channel data. As described above, how to use a subchannel in a 2-dimensional domain of a subchannel index SC and a time index t, i.e., which subchannel is to be assigned for transmission of particular data, is determined according to how a control channel and a data channel are formed in the OFDMA communication system.

(3) Subchannel Assignment Scenario in Cellular Environment

Figure 4:
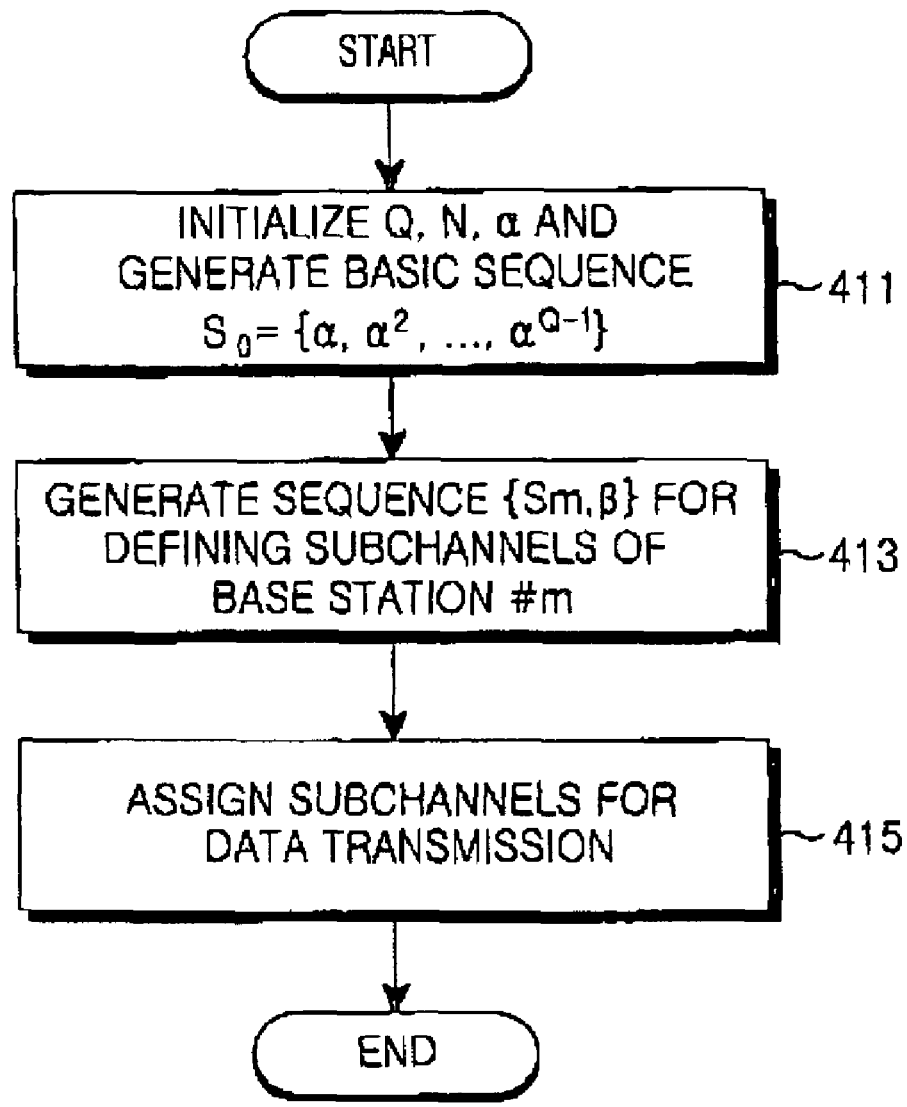
FIG. 4 illustrates a flowchart illustrating a subcarrier assignment procedure according to an embodiment of the present invention.

FIG. 4 shows a flowchart illustrating a subcarrier assignment procedure according to an embodiment of the present invention. Referring to FIG. 4, in step 411, a base station initializes parameters necessary for assigning subcarriers, i.e., a parameter Q representing a size of Galois Field, a parameter N representing the number of groups in one OFDM symbol, and a parameter $\alpha$ representing a primitive element of Galois Field(Q). Further, the base station generates a basic sequence $S_0$ using the initialized parameters Q, N, and. A process of generating the basic sequence $S_0$ has been described above with reference to FIG. 3.

In step 413, the base station generates a sequence $\{S_{m,\beta}\}$ for defining subchannels in a base station to which subcarriers should be assigned, for example, a base station #m. A process of generating a sequence $\{S_{m,\beta}\}$ for defining subchannels in a base station #m, as described with reference to Equation (4) and Equation (5), includes a first step of generating a sequence $S_m$ obtained by permuting the basic sequence $S_0$ generated in step 411 m times, and a second step of generating the sequence $\{S_{m,\beta}\}$ for defining subchannels in the base station #m. The process of generating the sequence $\{S_{m,\beta}\}$ for defining subchannels in the base station #m has been described above with reference to Equation (4) and Equation (5). The base station can perform the operation of step 413 each time a corresponding situation occurs, or according to corresponding data read from a data table in which situation data is previously stored.

In step 415, the base station assigns the subchannels for the data transmission considering the transmission data. Here, the base station assigns subchannels to be used for the data transmission using the rule described in conjunction with Equation (7), and a detailed description thereof will be omitted herein.

(4) Pilot Channel Generation Method in Cellular Environment

Generally, in a cellular communication system, pilot subcarriers are used for channel estimation and cell identification, and the present invention proposes a scheme for using a part of the subchannels as pilot channels. In the OFDMA communication system, in order to maintain a collision characteristic between subchannels, positions of the subcarriers constituting each of the subchannels should not be changed even after pilot subcarriers are inserted into the subchannels.

Therefore, the present invention proposes a scheme for using a part of subchannels defined in a time-frequency 2-dimensional domain as pilot channels. When a part of the subchannels is used as pilot channels, a maximum of one collision of subcarriers occurs between subchannels assigned to the pilot channels, such that the proposed scheme is very effective for a cellular system in which a frequency reuse rate is 1. In addition, a subscriber station can identify cells depending on a pattern of the pilot subcarriers during initial cell search or handoff.

Further, the subscriber station can determine a relative signal level of a neighbor cell using the pilot subcarriers. That is, because positions of pilot subcarriers are different for each cell, the subscriber station can perform cell search depending on positions of boosted pilot subcarriers rather than data subcarriers. Here, the pilot subcarriers are boosted by 3 to 6 [dB] over the data subcarriers, enabling the subscriber station to easily identify the pilot subcarriers. That is, the pilot signal becomes a kind of a reference signal for base station identification and channel estimation.

As is understood from the foregoing description, the present invention enables subchannel assignment for maximizing the number of identifiable base stations in the OFDMA communication system. In addition, the subchannel assignment according to the present invention prevents a reduction in system performance due to subchannel collision by minimizing a collision rate between subchannels for neighbor base stations. Furthermore, the present invention maximizes efficiency for cell search and channel estimation by using a part of assigned subchannels as pilot channels.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for assigning subchannels to each of a plurality of base stations included in a wireless communication system that divides an entire frequency band into a plurality of subcarrier bands and includes a plurality of subchannels, each of which is a set of a predetermined number of the subcarrier bands, the method comprising the steps of:

classifying the subcarrier bands in a predetermined period;

generating a number of subcarrier groups by dividing the predetermined period into a predetermined number of time periods;

detecting corresponding subcarrier bands, for a particular base station, from each of the subcarrier groups according to a predetermined sequence; and assigning the subcarrier bands detected from each of the groups as a subchannel for the particular base station, wherein the predetermined sequence is expressed as $$S_0 = \alpha, \alpha^2, \alpha^3, \ldots, \alpha^{Q-2}, \alpha^{Q-1},$$

where $S_0$ denotes the predetermined sequence, Q denotes a size of a Galois Field, and $\alpha$ denotes a primitive element of a Galois Field (Q).

2. The method of claim 1, wherein the step of generating further comprises the step of:

classifying the subcarrier bands into a predetermined number of groups in each of the time periods.

3. The method of claim 1, wherein the predetermined sequence represents indexes of subcarriers assigned as a first subchannel for each of the base stations.

4. The method of claim 3, further comprising the steps of:

generating a new sequence by adding a predetermined offset to the predetermined sequence;

detecting subcarrier bands from each of the groups according to the new sequence; and assigning the subcarrier bands detected from each of the groups according to the new sequence as a second subchannel for the particular base station.

5. The method of claim 3, further comprising the steps of:

generating a new sequence by permuting the sequence a predetermined number of times;

detecting subcarrier bands from each of the groups according to the new sequence; and assigning the subcarrier bands detected from each of the groups according to the new sequence as a second subchannel for the particular base station.

6. The method of claim 1, wherein the predetermined sequence is defined on a Galois Field.

7. The method of claim 1, further comprising the step of transmitting reference signals such that the reference signals have a pattern for identifying the base stations at particular subcarrier bands among subcarrier bands included the subchannel.

8. The method of claim 1, wherein the predetermined number of subcarrier groups is equal to a number of the base stations.

9. A method for assigning subchannels to each of a plurality of base stations included in a wireless communication system that divides an entire frequency band into a plurality of subcarrier bands and includes a plurality of subchannels, each of which is a set of a predetermined number of the plurality of subcarrier bands, the method comprising the steps of:

classifying subcarrier bands in each of a predetermined number of symbol periods;

generating a predetermined number of subcarrier groups by dividing the predetermined number of symbol periods into a predetermined number of time periods;

detecting corresponding subcarrier bands, for a first base station, from each of the groups according to a first sequence representing indexes of subcarriers assigned as a first subchannel;

assigning the subcarrier bands detected from each of the groups according to the first sequence as a first subchannel for the first base station;

detecting corresponding subcarrier bands, for a second base station, from each of the groups according to a second sequence obtained by permuting the first sequence a predetermined number of times; and assigning the subcarrier bands detected from each of the groups according to the second sequence as a first subchannel for the second base station, wherein the first sequence is expressed as $$S_0 = \alpha, \alpha^2, \alpha^3, \ldots, \alpha^{Q-2}, \alpha^{Q-1},$$

where $S_0$ denotes the first sequence, Q denotes a size of a Galois Field, and a denotes a primitive element of a Galois Field (Q).

10. The method of claim 9, further comprising the steps of:
generating a third sequence by adding a predetermined offset to the first sequence after assigning the first subchannel for the first base station;
detecting corresponding subcarrier bands from each of the groups according to the third sequence; and
assigning the subcarrier bands detected from each of the groups according to the third sequence as a second subchannel for the first base station.

11. The method of claim 10, wherein the third sequence is expressed as $$S_{m,\beta} = S_m + \beta, \beta, \beta, \ldots, \beta, \beta; \beta \in GF(Q),$$

where $S_{m,\beta}$ denotes a sequence representing indexes of subcarriers included in each of subchannels in an $(m+1)^{th}$ base station, $S_m$ denotes a sequence assigned to a first subchannel for the $(m+1)^{th}$ base station, $\beta$ denotes the offset, and GF(Q) denotes a Galois Field (Q).

12. The method of claim 9, further comprising the steps of:
generating a fourth sequence by adding a predetermined offset to the second sequence after assigning the first subchannel for the second base station;
detecting corresponding subcarrier bands from each of the groups according to the fourth sequence; and
assigning the subcarrier bands detected from each of the groups according to the fourth sequence as a second subchannel for the second base station.

13. The method of claim 9, wherein each of the first to fourth sequences is defined on a Galois Field.

14. The method of claim 9, wherein the second sequence is expressed as $$S_m = \alpha^m S_0 = \alpha^{Q-m}, \alpha^{Q-m+1}, \ldots, \alpha^{Q-2}, \alpha^{Q-1}, \alpha, \alpha^2, \ldots, \alpha^{Q-m-1},$$

where $S_m$ denotes a sequence assigned to a first subchannel for an $(m+1)^{th}$ base station, $S_0$ denotes the first sequence, Q denotes a size of a Galois Field, and a denotes a primitive element of a Galois Field (Q).

15. The method of claim 9, further comprising the step of transmitting reference signals such that the reference signals have a pattern for identifying the base stations at particular subcarrier bands among subcarrier bands included in the subchannel.

16. The method of claim 9, wherein the predetermined number of subcarrier groups is equal to a number of the base stations.

17. An apparatus for assigning subchannels to each of a plurality of base stations included in a wireless communication system that divides an entire frequency band into a plurality of subcarrier bands and includes a plurality of subchannels, each of which is a set of a predetermined number of the subcarrier bands, the apparatus comprising:
a subchannel assigning means for generating a predetermined number of subcarrier groups by dividing a predetermined period into a predetermined number of time periods, detecting corresponding subcarrier bands, for a particular base station, from each of the groups according to a predetermined sequence, and
assigning the detected subcarrier bands as a subchannel for the particular base station; and
a transmitting means for transmitting the data over the subchannel assigned by the subchannel assigning means, wherein the predetermined sequence is expressed as $$S_0 = \alpha, \alpha^2, \alpha^3, \ldots, \alpha^{Q-2}, \alpha^{Q-1},$$

where $S_0$ denotes the predetermined sequence, Q denotes a size of a Galois Field, and $\alpha$ denotes a primitive element of a Galois Field (Q).

18. The apparatus of claim 17, wherein the subchannel assigning means classifies the subcarrier bands into a predetermined number of groups in each of the time periods.

19. The apparatus of claim 17, wherein the predetermined sequence represents indexes of subcarriers assigned as a first subchannel for each of the base stations.

20. The apparatus of claim 19, wherein the subchannel assigning means, after assigning the first subchannel to the particular base station, generates a new sequence by adding a predetermined offset to the predetermined sequence, detects subcarrier bands from each of the groups according to the new sequence, and assigns the detected subcarrier bands as a second subchannel for the particular base station.

21. The apparatus of claim 17, wherein the predetermined sequence is defined on a Galois Field.

22. The apparatus of claim 17, wherein the transmitting means transmits reference signals such that the reference signals have a pattern for identifying the base stations at particular subcarrier bands among the subcarrier bands included in the subchannel.

23. The apparatus of claim 17, wherein the predetermined number of subcarrier groups is equal to a number of the base stations.

24. An apparatus for assigning subchannels to each of a plurality of base stations included in a wireless communication system that divides an entire frequency band into a plurality of subcarrier bands and includes a plurality of subchannels, each of which is a set of a predetermined number of the subcarrier bands, the apparatus comprising:
a subchannel assigner for generating a predetermined number of subcarrier groups based on a number of the base stations by classifying the subcarrier bands in each of a predetermined number of symbol periods and dividing the predetermined number of symbol periods into a predetermined number of time periods, detecting corresponding subcarrier bands, for a first base station, from each of the groups according to a first sequence representing indexes of subcarriers assigned as a first subchannel; assigning the detected subcarrier bands as a first subchannel for the first base station, detecting corresponding subcarrier bands, for a second base station, from each of the groups according to a second sequence obtained by permuting the first sequence a predetermined number of times, and assigning the detected subcarrier bands as a first subchannel for the second base station; and
a transmitting means for transmitting the data over the subchannels assigned by the subchannel assigner, wherein the first sequence is expressed as $$S_0 = \alpha, \alpha^2, \alpha^3, \ldots, \alpha^{Q-2}, \alpha^{Q-1},$$

where $S_0$ denotes the first sequence, Q denotes a size of a Galois Field, and a denotes a primitive element of a Galois Field (Q).

25. The apparatus of claim 24, wherein the subchannel assigner generates a third sequence by adding a predetermined offset to the first sequence, detects corresponding subcarrier bands from each of the groups according to the third sequence, and assigns the detected subcarrier bands as a second subchannel for the first base station.

26. The apparatus of claim 25, wherein the third sequence is expressed as $$S_{m,\beta} = S_m + \beta, \beta, \beta, \ldots, \beta, \beta;\ \beta \in GF(Q)$$

where $S_{m,\beta}$ denotes a sequence representing indexes of subcarriers included in each of subchannels in an $(m+1)^{th}$ base station, $S_m$ denotes a sequence assigned to a first subchannel for the $(m+1)^{th}$ base station, $\beta$ denotes the offset, and GF(Q) denotes a Galois Field (Q).

27. The apparatus of claim 24, wherein the subchannel assigner generates a fourth sequence by adding a predetermined offset to the second sequence after assigning the first subchannel for the second base station, detects corresponding subcarrier bands from each of the groups according to the fourth sequence, and assigns the detected subcarrier bands as a second subchannel for the second base station.

28. The apparatus of claim 27, wherein each of the first to fourth sequences is defined on a Galois Field.

29. The apparatus of claim 24, wherein the second sequence is expressed as $$S_m = \alpha^m S_0 = \alpha^{Q-m}, \alpha^{Q-m+1}, \ldots, \alpha^{Q-2}, \alpha^{Q-1}, \alpha, \alpha^2, \ldots, \alpha^{Q-m-1}$$

where $S_m$ denotes a sequence assigned to a first subchannel for an $(m+1)^{th}$ base station, $S_0$ denotes the first sequence, Q denotes a size of a Galois Field, and $\alpha$ denotes a primitive element of a Galois Field(Q).

30. The apparatus of claim 24, wherein the transmitting means transmits reference signals such that the reference signals have a pattern for identifying the base stations at particular subcarrier bands among subcarrier bands included in the subchannel.

31. The apparatus of claim 24, wherein the predetermined number of subcarrier groups is equal to a number of the base stations.

* * * * *

UNITED STATES PATENT AND TRADEMARK OFFICE
CERTIFICATE OF CORRECTION

PATENT NO.        : 7,633,900 B2                                          Page 1 of 1
APPLICATION NO. : 10/894220
DATED             : December 15, 2009
INVENTOR(S)      : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1548 days.

Signed and Sealed this

Twenty-first Day of December, 2010

David J. Kappos
*Director of the United States Patent and Trademark Office*